United States Patent [19]

Kutsch

[11] Patent Number: 5,240,209

[45] Date of Patent: Aug. 31, 1993

[54] TELECOMMUNICATION MULTIPLE CABLE CARRIER

[75] Inventor: Duane B. Kutsch, Otis Orchards, Wash.

[73] Assignee: Telect, Inc., Liberty Lake, Wash.

[21] Appl. No.: 977,886

[22] Filed: Nov. 17, 1992

[51] Int. Cl.⁵ ............................................. F16L 3/00
[52] U.S. Cl. ................................ 248/49; 59/78.1; 248/68.1; 248/74.1
[58] Field of Search ................ 248/49, 68.1, 51, 74.1, 248/65, 74.4; 59/78.1

[56] References Cited

U.S. PATENT DOCUMENTS

| | | | |
|---|---|---|---|
| 3,053,358 | 9/1962 | Gross | 248/49 |
| 3,197,954 | 4/1965 | Merker et al. | 59/78.1 |
| 3,363,050 | 1/1968 | Martin | 248/49 X |
| 3,664,619 | 3/1972 | Heidrich et al. | 248/51 |
| 4,104,871 | 8/1978 | Moritz | 248/68.1 X |
| 4,392,344 | 7/1983 | Gordon et al. | 59/78.1 |
| 4,396,797 | 9/1983 | Sakuragi et al. | 174/68 |
| 4,570,437 | 2/1986 | Moritz | 59/78.1 |
| 4,648,733 | 3/1987 | Merkt | 403/56 |
| 4,658,577 | 4/1987 | Klein | 59/78.1 |
| 4,672,805 | 6/1987 | Moritz | 248/49 X |
| 4,769,985 | 9/1988 | Moritz | 248/49 X |
| 4,800,714 | 1/1989 | Moritz | 248/49 X |
| 4,807,432 | 2/1989 | Mauri | 59/78.1 |
| 4,840,023 | 6/1989 | Borsani | 59/78.1 |
| 4,852,342 | 8/1989 | Hart | 59/78.1 |
| 4,988,838 | 1/1991 | Kirtland | 191/12 |
| 5,016,841 | 5/1991 | Schumann | 248/51 |
| 5,038,556 | 8/1991 | Moritz et al. | 59/78.1 |
| 5,108,350 | 4/1992 | Szpakowski | 474/207 |
| 5,157,913 | 10/1992 | Wehler | 59/78.1 |
| 5,163,281 | 11/1992 | Kanehira | 248/49 X |
| 5,174,104 | 12/1992 | Wehler | 59/78.1 |

FOREIGN PATENT DOCUMENTS

| | | |
|---|---|---|
| 659125 | 3/1963 | Canada ............................ 248/74.1 |
| 0021153 | 3/1981 | European Pat. Off. . |
| 1817593 | 4/1968 | Fed. Rep. of Germany . |
| 2310144 | 1/1978 | Fed. Rep. of Germany . |
| 3605382 | 3/1987 | Fed. Rep. of Germany . |
| 1441362 | 6/1976 | United Kingdom . |
| 2214604 | 7/1989 | United Kingdom . |
| 2219061 | 11/1989 | United Kingdom ............ 248/49 |

OTHER PUBLICATIONS igus, "Energy Chain System," Apr. 1992.

Primary Examiner—J. Franklin Foss
Attorney, Agent, or Firm—Wells, St. John, Roberts, Gregory & Matkin

[57] ABSTRACT

The preferred embodiment of a telecommunication multiple cable carrier 10 is illustrated in the drawings for receiving and supporting a bundle of telecommunication cables between one component 14 and a space component 16 in which one component is movable relative to the other. The carrier 10 comprises a plurality of interconnected links 18 that are pivotal with respect to each other and may be easily disconnected. The links have a central section with a female end section and an opposite male end section for interconnecting with adjacent sections. Side walls extend upward to a removable cover for defining a cavity 36 for receiving the cables.

10 Claims, 6 Drawing Sheets

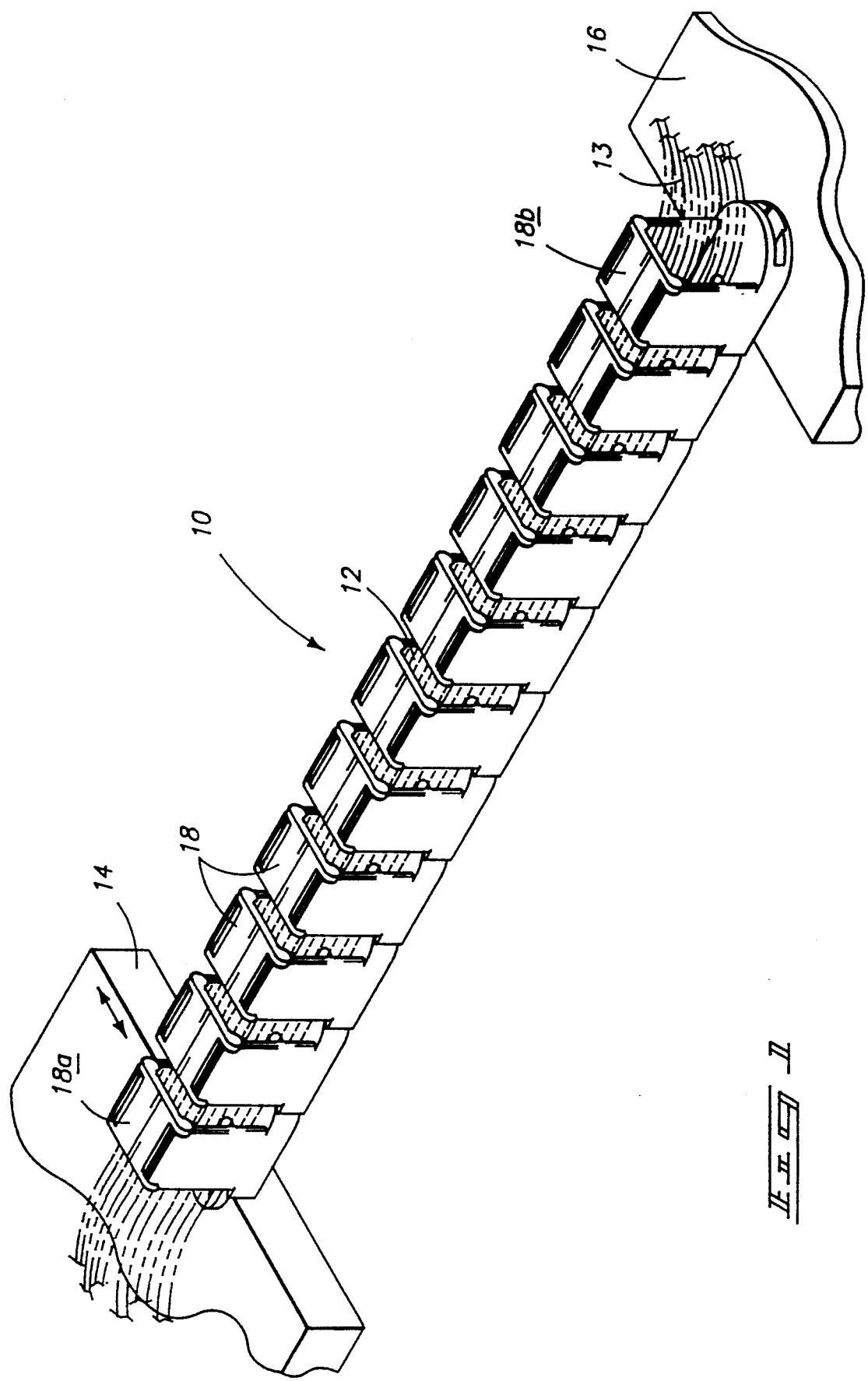

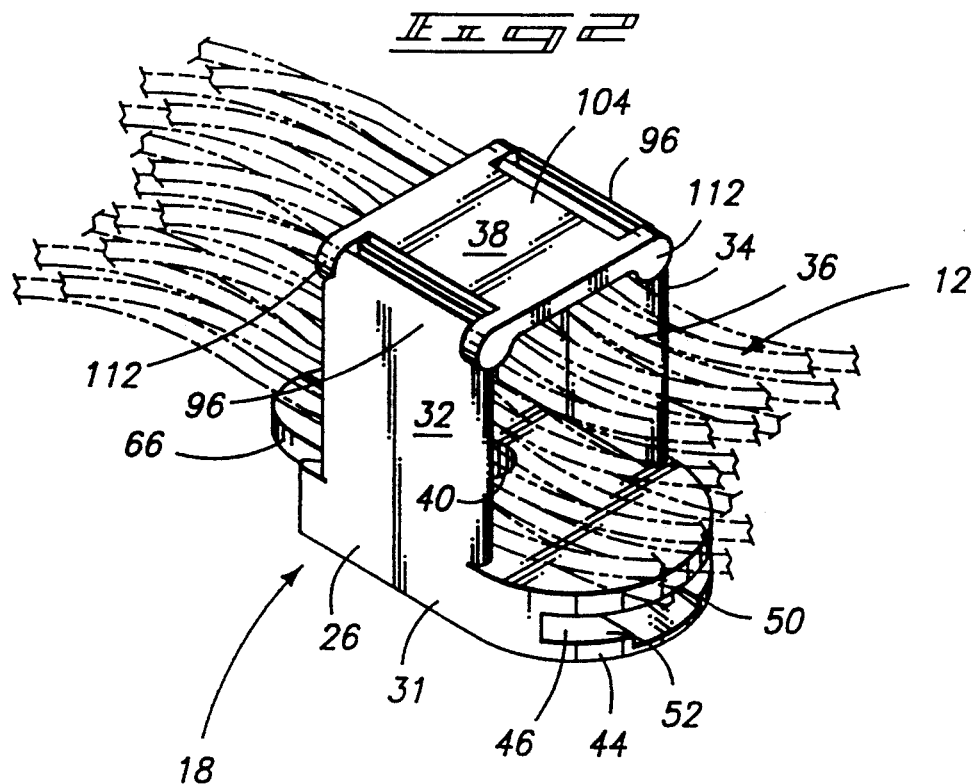
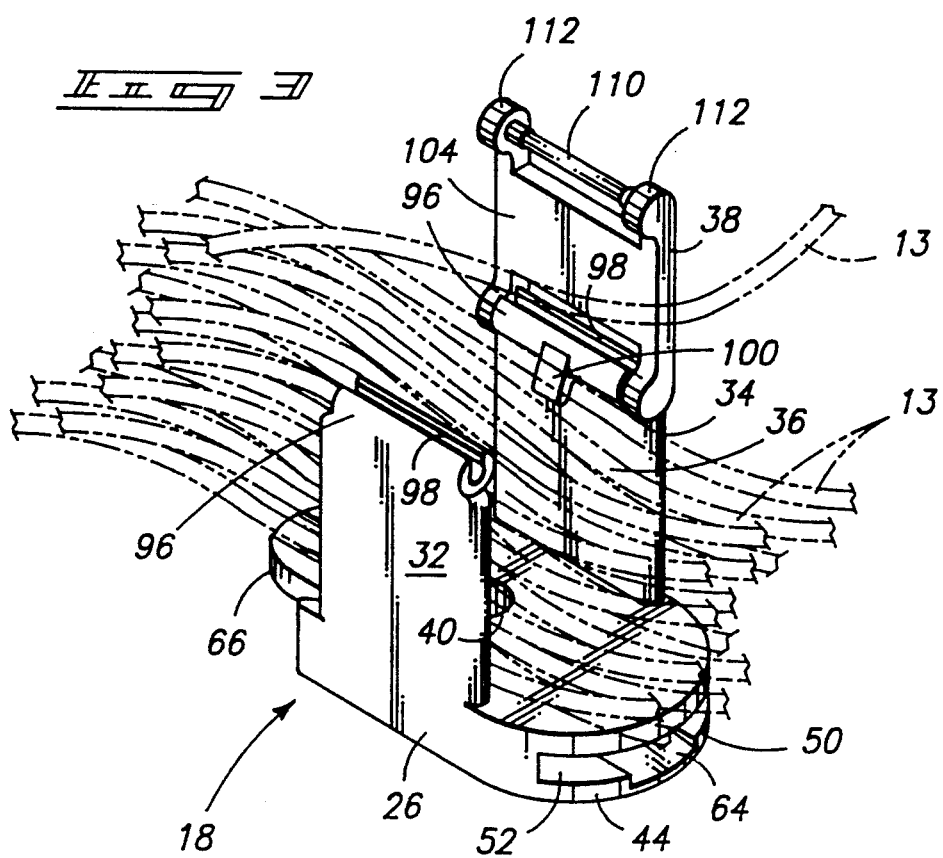

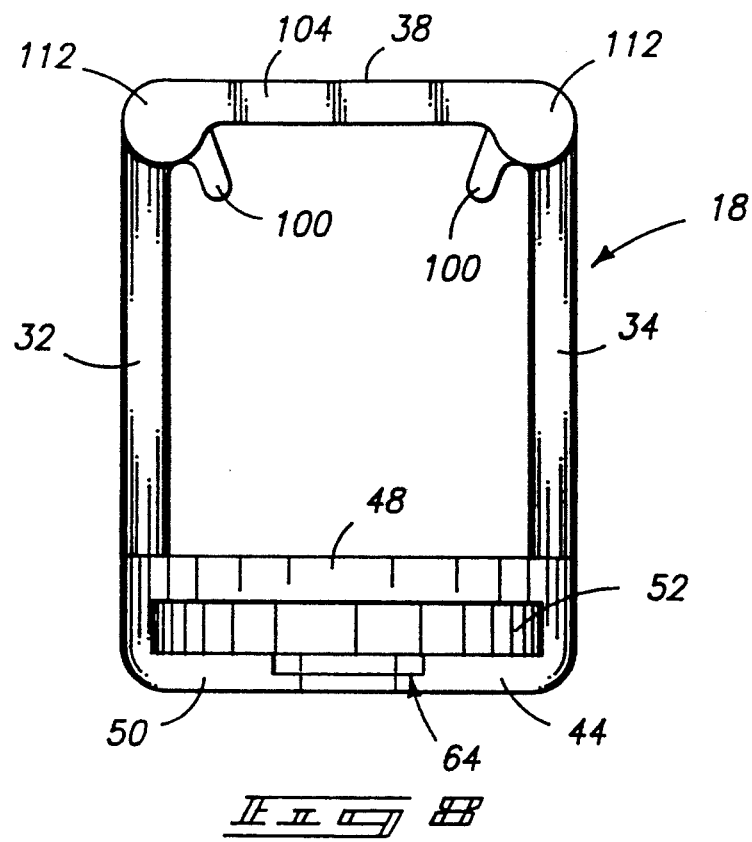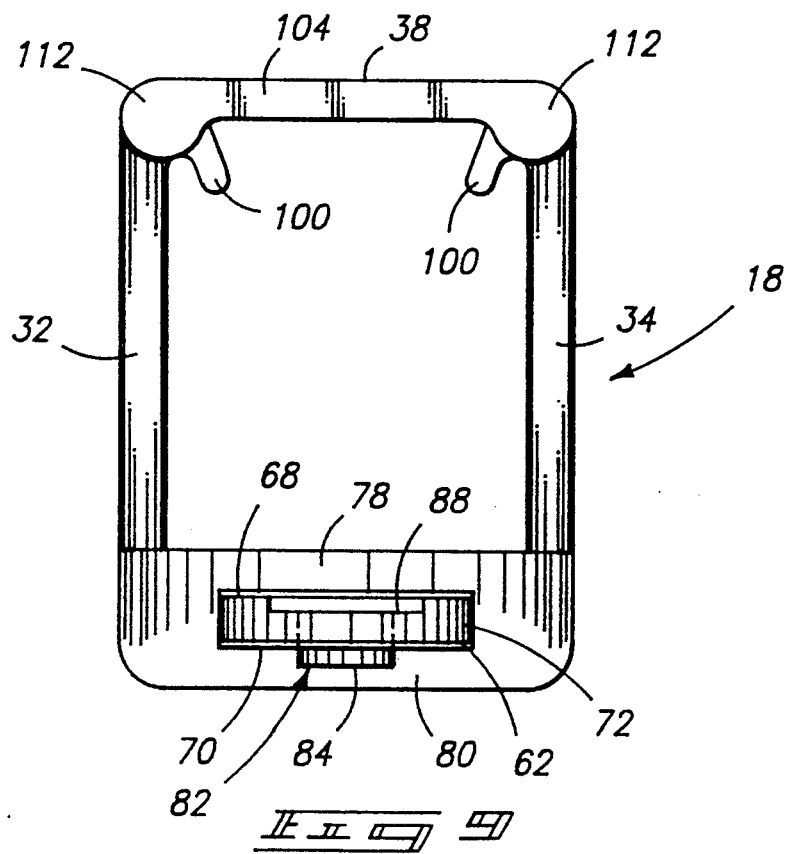

TELECOMMUNICATION MULTIPLE CABLE CARRIER

TECHNICAL FIELD

This invention relates to telecommunication multi-cable carrier.

BACKGROUND OF THE INVENTION

In the telecommunication field, it is very important to minimize any damage to telecommunication cables that could interrupt service or cause an expensive delay. It is particularly difficult to determine whether a telecommunication cable has been damaged through use, during maintenance periods, or during installation. It is particularly difficult to pin point the location of a broken cable or defective cable once it is installed. This is particularly important with respect to telecommunication cables such as fiber optic cables that are very susceptible to damage or inefficient operation when severely bent beyond a minimum bending radius.

One of the objects of this invention is to provide a telecommunication multiple carrier that is particularly adaptable for receiving a bundle of fiber optic cables to protect the cables even though the cables may be utilized in an atmosphere in which they may be moved and bent at various degrees.

A further object of this invention is to provide a telecommunication multiple cable carrier for receiving a bundle of fiber optic cables that minimizes the bend radius to which the cables may be subjected, while still enabling the cables to operate in a atmosphere in which the cables can be readily moved and placed in curved orientations without damage or overbending.

These and other objects and advantages of this invention will become apparent upon reading the following detailed description of a preferred embodiment.

BRIEF DESCRIPTION OF THE DRAWINGS

Preferred embodiments of the invention are described below with reference to the accompanying drawings, which are briefly described below.

FIG. 1 is an isometric view of a preferred embodiment of the telecommunication multiple cable carrier extending between two spaced components in which one of the components is stationary and the other component is moveable;

FIG. 2 is an isometric view of a single link of the carrier illustrated in FIG. 1 illustrating the link receiving and securing a bundle of fiber optic cables;

FIG. 3 is an isometric view similar to FIG. 2 except showing a cover being opened to enable one or more cables to be placed within the carrier or removed from the carrier;

FIG. 8 is an end view of a link illustrated in FIG. 4;

FIG. 9 is an end view opposite to the view of FIG. 8;

DETAILED DESCRIPTION OF THE PREFERRED EMBODIMENTS

Figure 4:
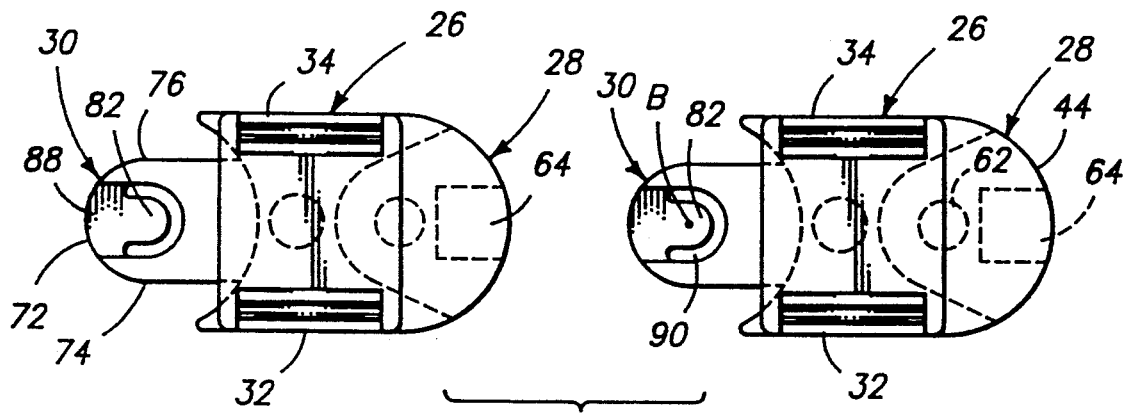
FIG. 4 is a top view of two of the carrier links shown in a spaced apart orientation.

This disclosure of the invention is submitted in furtherance of the constitutional purposes of the U.S. Patent Laws "to promote the progress of science and useful arts" (Article 1, Section 8).

A preferred embodiment of this invention is illustrated in the accompanying drawings in which FIG. 1 illustrates a telecommunication multiple cable carrier generally designated with the numeral 10 for receiving a bundle 12 of telecommunication cables 13. Preferably, each cable 13 is a fiber optic cable. The carrier is able to receive, protect and support the cables between two components 14 and 16 which are spaced at different locations. The components 14 and 16 may both be stationary, or one may be stationary and the other moving, or both may be movable relative to each other. The purpose of the carrier 10 is to accommodate such movement without overbending the cables and to protect the cables from damage. The carrier 10 enables a desired group of related cables to be organized in a bundle for easy identification and access. The carrier 10 provides for removal of individual cables 13 from the bundle 12 and for the addition of cables 13 as desired.

The carrier 10 includes a plurality of interconnected links 18 (FIGS. 2-11) in which an end link 18a is secured to component 14 and end link 18b is secured to component 16. A plurality of intermediate links 18 are interconnected to each other and to the end links 18a and 18b spanning the distance between the two locations of the components 14 and 16.

The carrier 10 is particularly adapted to environments in which one of the components is movable relative to the other to enable the bundle 12 of cables 13 to be easily moved with the movable component without over bending the individual cables 13 or damaging the individual cables 13 during such movement. For example, it is important that fiber optic cable not be bent in a radius of less than 1.5 inches; otherwise, the transmissional characteristics of the fiber optic cable can be adversely affected.

Each of the links 18 includes a central section 26, a female end section 28, and a male end section 30. Central section 26 includes a base 31 and upright side walls 32 and 34 defining a longitudinal cavity 36 between the walls 32 and 34 for receiving a bundle of cables 13. Each link 18 includes an operable cover 38 for enabling the bundle 12 and cables 13 to be mounted in or removed from the longitudinal cavity 36.

Figure 10:
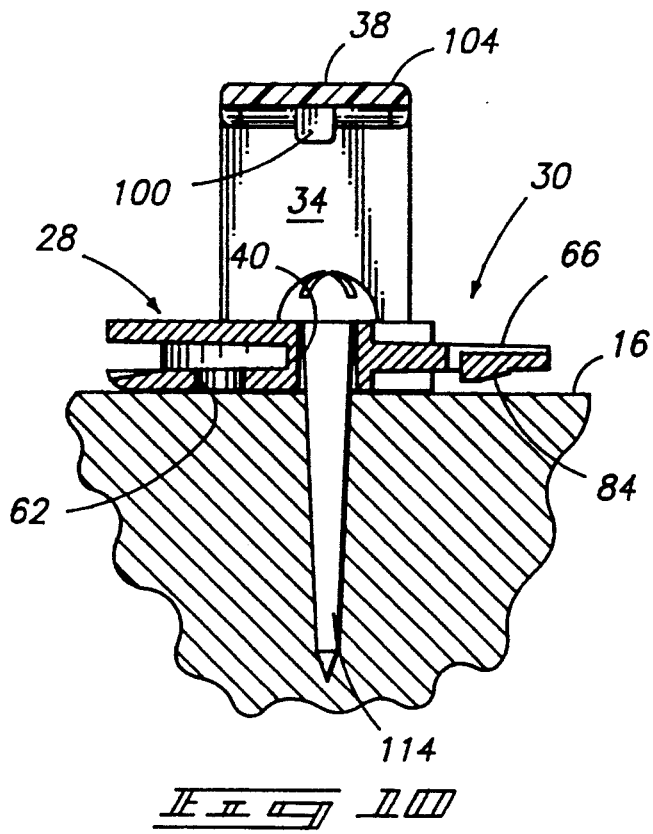
FIG. 10 is a vertical longitudinal cross-sectional view of a link showing a fastening element fastening either the beginning or ending link to one of the spaced components.

In the preferred embodiment, the base 31 has an aperture 40 formed therein to enable the link to be secured to a component such as 14 and 16 as illustrated in FIG. 10.

The female end section 28 includes a concave arcuate peripheral surface 44 having a wedge-shaped horizontal cavity 46 formed therein defining an upper end portion 48 and lower end portion 50 (FIGS. 2, 3, 6 and 8). The horizontal cavity 46 defines a wide entrance 52 in the peripheral surface 44 as illustrated in FIGS. 2 and 8. A cavity 46 extends from the wide entrance 52 toward the central section 26 with inclined side walls 54 and 56 (FIGS. 5 and 7) narrowing from the wide entrance 52 to a curved apex wall 60. The inclination of the side walls 56 and 58 define a pivot angle α.

Each of the female end sections 28 includes a detent aperture 62 (FIGS. 5 and 7) that defines a pivot axis A about which the link may pivot with respect to an adjacent link that is interconnected to the female end section 28. The lower end portion 50 includes an incline entrance ramp or surface 64 for facilitating the insertion of a complementary detent into the detent aperture 62 as will be further explained.

Figure 6:
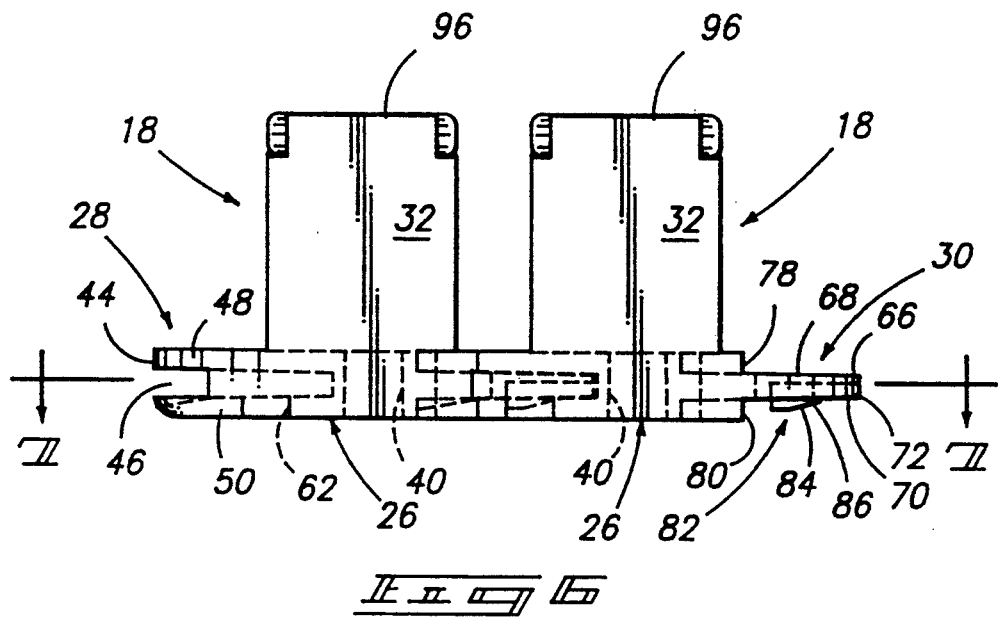
FIG. 6 is a side view of one of the links illustrated in FIG. 4.
Figure 7:
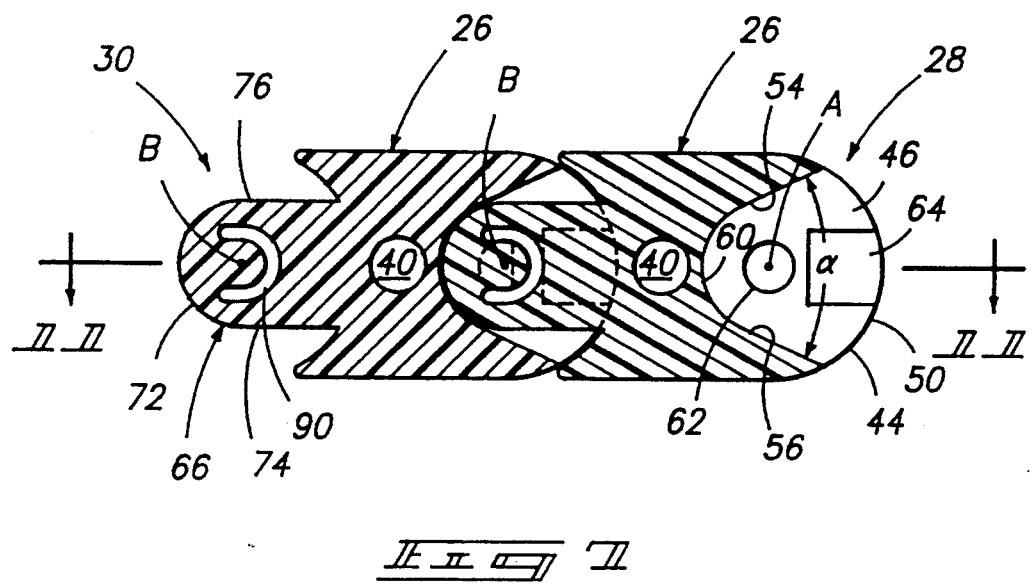
FIG. 7 is a horizontal cross-sectional view taken along lines 7—7 in FIG. 6.

Each of the male end sections 30 includes a blade 66 that extends outward from the central section 26 in which the blade has an upper surface 68 and a lower surface 70 (FIGS. 6 and 9). The blade 66 has a curved outer end surface 72 that is preferably complementary to the curved apex wall 60. Further, the blade 66 has parallel side walls 74 and 76 (FIGS. 4, 6 and 7). The side walls 74 and 76 serve as abutment walls with respect to the inclined side walls 56 and 58 of the cavity 46 to prevent further pivotal movement of one link with respect to the other. The male end section 30 includes an upper convex surface 78 and a lower convex surface 80 (FIGS. 6 and 9) for receiving the upper end portions 48 and 50 of a female end section 28 of an adjacent link 18.

Figure 11:
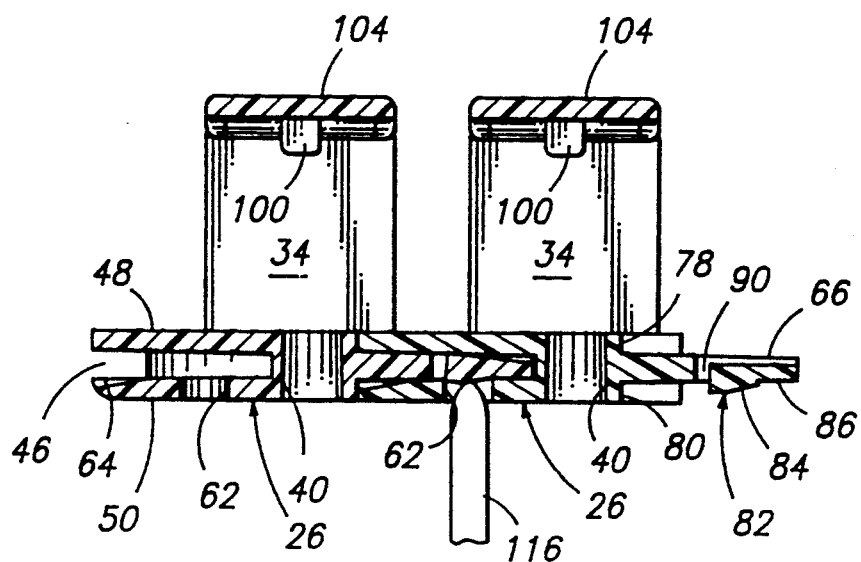
FIG. 11 is a vertical longitudinal cross sectional view illustrating the use of a pointed tool to disconnect the links once they are interconnected.

The male end section 30 has a cantilevered spring detent 82 formed on the blade 66 that defines a pivot axis B about which the link is capable of pivoting with respect to an adjacent link. The cantilevered spring detent 82 includes a downwardly projecting cylindrical projection 84 (FIGS. 6 and 9) for mating with and projecting into a complementary detent aperture 62 of an adjacent link. The projection 84 has an inclined bottom surface 86 (FIG. 6) to assist in disconnecting one link from the other. The blade 66 includes a channel 88 (FIGS. 4, 5 and 9) extending from the curved outer surface 72 over the spring detent 82 terminating in a U-shaped channel aperture 90. The channel aperture 90, formed in the blade 66, provides a cantilevered spring arm to support the detent 82. The channel 88 provides a recess to enable the detent to be deflected upward by a disconnecting tool as illustrated in FIG. 11.

As illustrated in FIGS. 2, 3, 8 and 9, each of the upright side walls 32 and 34 have an enlarged hinged upper end 96 with a longitudinal cylindrical slot or hinged groove 98 formed therein to receive the releasable cover 38. Additionally, each of the walls 32 and 34 includes a shoulder projection 100 (FIGS. 3, 8 and 9) that extends into the cavity adjacent the cover 38 to facilitate insertion of the cables, to hold the cables within the cavity, and to minimize the movement of the cables as one component 14 moves relative to component 16.

The releasable cover 38 includes a transversely extending cover body 104 that extends to transverse sides for mating with the enlarged hinge upper ends 96 of the upright side walls 32 and 34. At each side, a hinge shaft 110 is provided for snap insertion into a respective hinge groove 98. As illustrated in FIGS. 3, 8 and 9, the body 104 includes enlarged shaft heads 112 at the end of the shaft 110.

Each of the links may be interconnected with an adjacent link by inserting the male end section 30 into a female end section 28 of an adjacent link with the spring detent 82 initially engaging the entrance surface 64 and moving inward and upward until reaching the detent aperture 62. At that point, the cantilevered detent 82 springs within the aperture 62 interconnecting the two links. During operation, the links 18 may be pivoted relative to each other about axes A and B with the limit of the pivotal movement limited by the engagement of the pivotal side walls 74 or 76 of the male blade 66 into abutment with the incline complementary walls 54 and 56 of the female cavity 46. The angle α is preset to prevent the links 18 from being pivoted to form an arc having a radius of curvature less than 1.5 inches.

Figure 5:
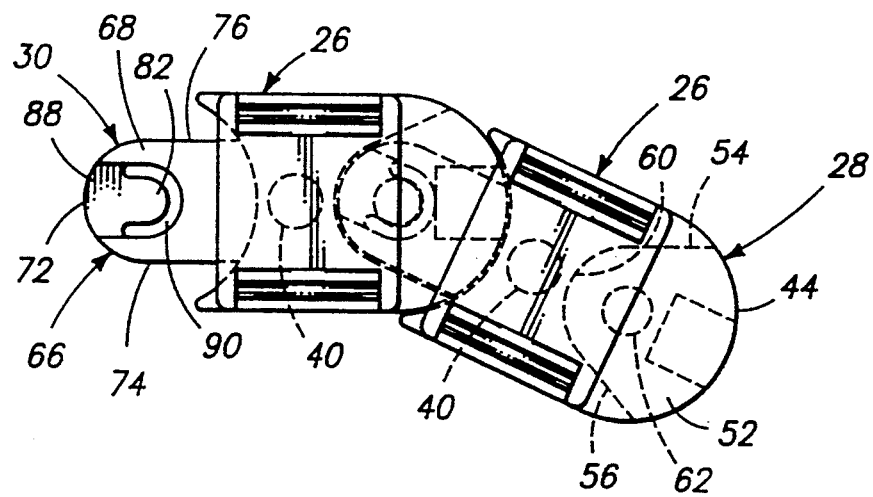
FIG. 5 is a top view similar to FIG. 4 except showing the two links interconnected and pivoted about a common pivot point.

To readily disconnect one link 18 from another, a release tool 116 illustrated in FIG. 11 is inserted through the aperture 62 and into engagement with the projection 84 to push the projection and the detent 82 upward into the channel 88 as illustrated in FIG. 11 to enable the male end section 30 to be pulled from the female end section 28. FIG. 4 illustrates two links 18 being separated, and FIG. 5 shows the two links 18 being interconnected. FIGS. 6 and 7 shows the interconnection of the links 18.

If it is desirable to add or subtract fiber optic cables 13 from the carrier, one merely pivots the cover 38 to an open position as illustrated in FIG. 3 to insert or remove the desired cable 13. The cover 38 is then snapped closed, as illustrated in FIG. 2, to fully encompass the bundle of cables 12 to receive, support and protect the cables from injury or undue bending.

The length of the carrier 10 may be adjusted by adding or subtracting the number of links. It should be noted that the links 18 are pivotal about the upright axes A and B in a substantially horizontal plane, but are substantially resistant to deflection in vertical plane, thus providing important support enabling the carrier to span substantial distances without exterior support.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A telecommunication multiple cable carrier for receiving and supporting a bundle of telecommunication cables between two spaced locations while preventing such cables from being bent in an arc of less than a predetermined radius of curvature between the two locations, comprising:

a plurality of cable links that are pivotally interconnected to collectively extend between the two spaced locations;

each of the links having a central section, a female connector section and a male connector section;

said central section having a base, spaced upright side walls and a cover extending between the side walls forming a bundle passageway through the link to receive the bundle of cables therein;

said female connector section having a female connector element for receiving a complementary male connector element of an adjacent link to enable the link to pivot in a substantially horizontal plane about a first upright pivot axis defined by the female connector element;

said male connector section having a male connector element for projecting into a complementary female connector element of an adjacent link to enable the link to pivot in the substantially horizontal plane about a second upright pivot axis spaced from and defined by the male connector element;

said male and female connector elements having complementary abutment means for limiting the pivotal movement of each link relative to its adjacent link about the upright axes to prevent the carrier from forming an arc having a radius of curvature less than the prescribed radius of curvature to minimize damage to the cables; and wherein the cover has opening means to enable one or more of the cables to be removed from the cable passageway without having to pull the cables longitudinally through the passageways.

2. The telecommunication multiple cable carrier as defined in claim 1 wherein cover opening means includes a longitudinal hinge for enabling the cover to be pivoted upward about the longitudinal hinge to provide access to the cables.

3. The telecommunication multiple cable carrier as defined in claim 1 wherein the cover opening means include longitudinal hinges integrated with upper ends of the upright side walls to enable the cover to pivoted upward toward either side wall to provide easy access to the cables from either side of the carrier.

4. The telecommunication multiple cable carrier as defined in claim 1 wherein each of the complementary male and female connector elements include releasable detent means for interconnecting one link to an adjacent link and to prevent their disconnection by longitudinal forces applied to the carrier or to the cables supported therein.

5. The telecommunication multiple cable carrier as defined in claim 4 wherein the releasable detent means may be released by the application of vertical force applied one of the connector elements.

6. The telecommunication multiple cable carrier as defined in claim 4 wherein one of the complementary connector elements includes an indentation and the other complementary connector element includes a detent that projects into the indentation of the one connector element to interconnect adjacent links and wherein the one complementary connector element includes an access aperture for enabling the detent to be dislodged from the indentation by the insertion of tool into the access aperture and the application of a vertical force on the tool.

7. The telecommunication multiple cable carrier as defined in claim 4 wherein one of the complementary connector elements has an vertically oriented aperture formed therein coaxial with a pivot axis and wherein the other complementary connector element has a projecting detent formed thereon for projecting into the vertically oriented aperture to interconnect the complementary connector elements to secure adjacent links together and wherein the other complementary connector element has a spring supporting means for supporting and normally urging the projecting detent into the vertically oriented aperture and wherein the vertically oriented aperture is of sufficient size to enable a tool to be inserted into the vertically oriented aperture to dislodge the detent from the aperture to enable the connector elements to be disconnected.

8. The telecommunication multiple cable carrier as defined in claim 7 wherein the spring support means includes a cantilevered arm spring supporting the projecting detent urging the projecting detent into the indentation.

9. The telecommunication multiple cable carrier as defined in claim 1 wherein at least one of the links has an aperture formed in the central section for enabling a securing means to be inserted though the aperture to secure one end of the carrier at one of the locations.

10. The telecommunication multiple cable carrier as defined in claim 1 wherein the female connector section includes a wedge shaped cavity formed therein extending from a wide entrance along inclined side walls toward an apex and wherein the male connector section has a blade that projects into the wedge shaped cavity of an adjacent link in which the blade has sidewalls which are angularly spaced from the inclined side walls of the wedge shaped cavity when the interconnected links are linearly oriented but which engage the inclined side walls to prevent the links being formed in an arc having a radius of curvature less than the predetermined radius of curvature.

* * * * *